Patented Oct. 17, 1933

1,930,792

UNITED STATES PATENT OFFICE 1,930,792

PROCESS OF TREATING LIQUIDS

Wilson Evans, Chicago, Ill., assignor to National Aluminate Corporation, Chicago, Ill., a corporation of Delaware No Drawing. Application August 11, 1930
Serial No. 474,658

10 Claims. (Cl. 210—23)

My invention relates to improvements in processes of treating water and is primarily adapted for the treatment of water in softening and clarification plants adapted to prepare it for commercial purposes such as for use in boilers, laundries, fruit canning plants, dye-houses, chemical processes, or for domestic uses.

One of the objects of the invention is to treat natural waters with a reagent that enhances the clarification and softening thereof, by insuring a more complete reaction of the ordinary softening and clarifying reagents, whereby, after filtering off the resultant precipitate, so-called after-reactions will not take place.

Another object of the invention is to treat water with a mixture of aluminum chloride, lime and soda ash so as to effect a purification and softening of the water.

I propose to use in connection with any ordinary water softening or treating mixture, a reagent which will expedite and cause to progress nearer to completion the process carried on by the softening or treating mixture and to some extent by the additional reagent itself, and which coagulates or flocculates the resultant precipitate so as to carry down and settle out with such precipitate any other matter which may be in suspension, thus rendering settling or filtration easier and more rapid and positive. In the case of treatment for clarification alone, the reagent may be used alone or in combination with other chemicals, either added, combined or separately.

The reagent or catalyst which I propose to use is aluminum chloride, which may be prepared for example by treating aluminous material with hydrochloric acid to render the aluminum soluble in the chloride form, or it may be prepared by any of the commercial processes for producing anhydrous aluminum chloride, such as the chlorination of mixtures of aluminum bearing materials like bauxite with carbonaceous material such as coke or coal at high temperatures. Other sources of aluminum chloride may also be used such, for example, as the material produced as a by-product from the processes in dye, chemical, or textile plants. A typical analysis of such a by-product material obtained from a chemical plant is as follows:

| | |
|---|---|
| Specific gravity at 25°C | 1.117 |
| $Al_2O_3$ | 4.80 |
| $AlCl_3$ | 12.56 |

Other commercial forms of aluminum chloride are also satisfactory, such for example, as the commercial 32° Baumé solution which contains approximately 50% $AlCl_3.6H_2O$ or 27.6% $AlCl_3$. Another commercial form is the crystalline material which is approximately 100% $AlCl_3.6H_2O$.

When my process is applied for the softening of water, it is preferably carried on in connection with a treatment with lime or with lime and soda ash. In some respects my process is analogous, insofar as the sequence of operations is concerned, with that described in my United States Patents 1,620,332 and 1,620,333, of March 8, 1927. The processes disclosed in said patents involve the use of an alkaline compound, namely sodium aluminate; whereas I have now discovered that the acid-reacting aluminum chloride has particular virtues when employed in connection with my present invention. The purpose of such treatment independent of my invention is to remove from the water the dissolved calcium and magnesium salts present largely in the form of bicarbonates, carbonates and sulphates. The lime is used to convert the soluble calcium bicarbonate into the corresponding insoluble carbonate and also to convert the soluble magnesium bicarbonate into the corresponding partially soluble magnesium carbonate, which latter is reacted upon by a further amount of lime to form the insoluble magnesium hydroxide, such action being expedited and carried further toward completion by my treatment. The soda ash converts the calcium sulphate into the corresponding insoluble carbonate and converts the magnesium carbonate which is in turn acted upon by the lime used in the treatment and converted into the insoluble magnesium hydroxide, such action being expedited and carried further toward completion by my treatment. Experience shows that, particularly when water is treated cold with lime and soda ash only, the reactions above indicated, especially in so far as the formation of the insoluble magnesium hydroxide is concerned, progresses very slowly and only to a partial extent, and in order to secure reasonably complete elimination of the dissolved calcium and magnesium salts it is necessary to employ a considerable excess amount of soda ash and lime. As an illustration of this action, the following test made on a sample of hard water may be cited:

In the said tests the hardness of the water is expressed in the conventional terms of "grains per gallon," the numerical data representing hypothetical grains of $CaCO_3$. The hardness, irrespective of whether it is actually due to $CaCO_3$ or not; and also the actual soluble alkalinity of the water, is always expressed as $CaCO_3$ in terms of grains per gallon. This is uniform practice in the control of water works and while perhaps not scientifically accurate, at least has the great advantage of uniformity of calculations and reporting of results of control analyses by which the dosing of the water is controlled by the water-works chemist.

In the further description hereinbelow, the term "ghost-point" is used. This is the point in the titration of the water with a standard soap solution where the first sign of a permanent lather is apparent. In all cases, the numeral data in the examples refer to grains of $CaCO_3$ per United States gallon (128 fluid ounces).

The untreated water showed a hardness by the conventional soap test of 7.5 grains per gallon on the basis of calcium carbonate with a total alkalinity determined by methyl orange titration of 6.8 grains per gallon also expressed as calcium carbonate. This water also shows a ghost point, g. p., of 5.1 also as calcium carbonate, this indicating the end of the calcium in the ordinary soap titration.

The following tabulation shows tests on this water treated (1) with proper amounts of lime and soda ash, and (2) with the same amounts of lime and soda ash along with aluminum chloride, the dosages being indicated in terms of grains per gallon, the aluminum chloride used being the by-product material previously referred to.

Table 1

| Test No. | Treatment grains per gallon | | | H | G.P. | P | M | S | O | N |
|---|---|---|---|---|---|---|---|---|---|---|
| | Lime | Soda ash | $AlCl_3$ | | | | | | | |
| Raw $H_2O$ | None | None | None | 7.5 | 5.1 | | 6.8 | | | |
| 1 | 8.6 | 4.7 | None | 3.2 | 2.0 | 4.3 | 6.0 | 2.8 | 2.6 | 0.2 |
| 2 | 8.6 | 4.7 | 1.75 | 1.2 | 0 | 2.0 | 3.1 | 1.9 | 0.9 | 1.0 |

The figures show results of the tests expressed under the headings H, G. P., P, M, S, O and N. In this tabulation H refers to the total soap hardness, G. P. (ghost point) to the end of the calcium or the total calcium, H minus G. P., therefore, being the magnesium as determined by the soap titration; P refers to the titration with acid in the presence of phenolphthlein as the indicator, M referring to the titration with acid using methyl orange as the indicator. S is equal to M minus H, or the soda alkalinity; O equals 2P minus M and the so-called caustic alkalinity and N equals S minus O or the sodium carbonate alkalinity. All of these figures are expressed in terms of calcium carbonate.

It will be noted from this tabulation of results that the hardness of the water remains relatively high even with the excess treatment of lime and soda ash showing that the theoretical softening reactions have not been completed. Owing to this incompleteness of reaction and the relatively high residual hardness, many difficulties are experienced with water so treated, among which perhaps the more important are slowness of settling, troubles encountered in filtration, and after-reaction. Not only do the reactions as outlined in the case of the treatment with lime and soda ash alone progress slowly and incompletely, but the precipitates formed are very fine and settle slowly, and when filtration is used, water so treated filters with difficulty, resulting sometimes in cloudy effluents, especially at high rates of filtration. Moreover, even when the visible precipitates have been settled or filtered and the water is crystal clear, there is an after-reaction which results in a very gradual though long continued formation of precipitates, which are deposited on the grains of sand or silica used as the filtering medium, or on the pipes through which the water flows, causing the individual grains to grow or the pipes to be gradually clogged. If the crystal clear water which has been treated by the lime-soda ash process is introduced into a boiler or otherwise heated, the after-reaction is greatly speeded up with the formation of further precipitates in relatively large quantities, causing foaming and scale formation and this difficulty is increased if in the effort to insure complete reaction an increased amount of lime and soda ash have been used.

It is to avoid the difficulties above referred to, that I have developed my process. The above tabulation indicates very clearly that with a relatively very small dosage of aluminum chloride, namely in this case 1.75 grains per gallon or in other terms, approximately ¼ of a pound of the aluminum chloride solution per 1,000 gallons of water treated, and which in this case amounts only to 0.0313 pounds of actual aluminum chloride or 0.012 pounds actual $Al_2O_3$ per 1,000 gallons of water owing to the fact that the solution used contains only 12.56% aluminum chloride and 4.8% $Al_2O_3$, that is to say, with this very small treatment of coagulant in addition to the softening agent, the hardness of the water is reduced in an amount entirely out of proportion to the treatment, namely, down to 1.2 grains per gallon with complete elimination of calcium. The reaction, therefore, being more nearly completed and the hardness much further reduced, the treated water does not exhibit the tendency to incrust filters and to produce deposits in distribution lines and the more or less colloidal calcium carbonate and magnesium hydroxide formed in the usual lime-soda softening process are more completely flocculated and hence the settling and filtration of the water is much more rapid and satisfactory.

It should also be noted from the data tabulated that by the use of aluminum chloride along with the lime and soda ash, the excess alkalinities are very materially reduced. For example, the total soda alkalinity has been reduced from 2.8 to 1.9 and the caustic alkalinity, O, has been reduced from 2.6 to 0.9, a total reduction of 1.7 grains per gallon. This condition results in spite of the fact that the hardness has at the same time been reduced from 3.2 to 1.2. This is a very important consideration, particularly if the treated water is to be used in steam-boilers because of the fact that a very much higher concentration can be carried in the boiler without such high caustic alkalinities developing which might cause troubles, such, for example, as the caustic embrittlement of the boiler metal.

My process is carried out by using a suitable quantity of aluminum chloride in addition to the lime and/or soda ash, which aluminum chloride may be added directly to the lime and/or soda ash mixture, or added separately after the lime and/or soda ash has been added to the water to be treated.

When this is done, rapid precipitation and coagulation takes place and the precipitate settles down in a flocculent form carrying with it as above indicated the organic or other matter which may be in suspension in the water. The water and the precipitates are then separated in any suitable way, as by drawing off the clear, supernatant water, and if desired, by filtering, although this is not ordinarily necessary with my process on account of the greatly improved settling secured by it. The resultant clarified, purified, softened water will then be fed directly into the boiler and can be heated without bringing down any appreciable amount of further precipitate, or it may be used in the manufacture of artificial ice where, owing to the absence of the salts otherwise present, better, less brittle and clearer ice is formed, or this water may be satisfactorily used for the other purposes for which intended, including domestic uses.

In carrying on my process a number of different chemical reactions, as follows, probably take place: When the aluminum chloride solution is mixed with lime alone, or with lime and soda ash, the lime or calcium hydrate combines with the aluminum chloride to form calcium chloride and aluminum hydroxide. This aluminum hydroxide acts as a coagulant and in addition to removing colloidal or suspended calcium carbonate and magnesium hydroxide or other products of the softening reaction, it also acts as a coagulant for turbidities, color, etc. present in the original untreated water, and a much more satisfactory water is thus produced than would be obtained without the use of the aluminum chloride as a coagulant. This reaction may be illustrated by the following equation:

$$2AlCl_3 + 3Ca(OH)_2 = 2Al(OH)_3 + 3CaCl_2$$

The reactions for the magnesium salts are the same except that the partially soluble magnesium carbonate is brought down as follows:

$$MgCO_3 + Ca(OH)_2 = Mg(OH)_2 + CaCO_3$$

In the process of clarification of water, coagulating agents are very commonly used for the purpose of collecting together or flocculating the suspended material, color, etc., to improve the settling rate, and filtration rate and to extend the life of filters, that is, to increase the quantity of water which may be passed through a given filter in a given time and at the same time also to reduce the amount of water required to backwash or clean the filter after the filter run. I find aluminum chloride very satisfactory for this purpose and have included in the following tabulation data obtained as a result of treatment of a turbid water. The reduction in turbidity indicates the very positive coagulating and clarifying effect of the aluminum chloride treatment.

*Table 2*

| Test No. | Treatment grains per gallon | | Turbidity | M | pH |
|---|---|---|---|---|---|
| | Aluminum chloride | Sodium aluminate | | | |
| Raw water | None | None | 70 p.p.m. | 6.5 | 7.7 |
| 1 | 1.1 | None | 0 | 5.3 | 7.2 |
| 2 | 0.7 | 0.2 | 0 | 5.9 | 7.5 |

It is known that aluminum sulphate (alum) and ferrous sulphate (copperas) are used as coagulants in clarification and in connection with the lime-soda ash method of water softening. It is a well-known fact, however, that the negative ions like sulphate and chloride exert a certain negative coagulating effect, that is to say, that the sulphate ions or the chloride ions when aluminum is applied to a water in the form of the sulphate or the chloride would tend to reduce the coagulating effect of the aluminum hydroxide produced in the water. It is further known, however, that the chloride ion very frequently exerts a much smaller negative coagulating effect than does the sulphate, and it is for this reason that we propose the use of aluminum chloride in place of aluminum sulphate or iron sulphate and other coagulants containing the sulphate ion.

It will be noted from the foregoing, that contrary to what might have been expected, aluminum chloride is not the equivalent of sodium aluminate, and while aluminum sulphate and alum have been used in the past in connection with the flocculation of impurities in water, it should be distinctly understood that in the present case aluminum chloride is not a substitute for sodium aluminate, the former presenting distinct and hitherto unrecognized advantages upon which the present invention is predicated.

The present invention is not limited to any particular apparatus or application but is to be construed in accordance with the hereunto appended claims in view of the prior art.

What I claim and desire to protect by Letters Patent is:

1. The process of treating liquids which consists in mixing in solution lime, soda ash and aluminum chloride and then mixing the resultant product with the liquid to be treated and then separating the resultant precipitates from the liquid.

2. The process of softening water which consists in adding aluminum chloride to a water softening compound adapted to react on the water to precipitate out insoluble salts and then mixing the resultant product with the water and separating the water and the precipitate thus formed.

3. The process of treating liquids which consists in mixing in solution lime and aluminum chloride and then mixing the resultant product with the liquid to be treated and then separating the resultant precipitates from the liquid.

4. The process of treating liquids which consists in making up a mixture of lime, soda ash and aluminum chloride and then mixing same with the liquid to be treated and then separating the resultant precipitates from the liquid.

5. The process of purifying water which comprises treating the same with a mixture comprising aluminum chloride, an alkaline earth hydroxide and an alkaline carbonate.

6. The process of treating water which comprises preparing a mixture of an alkaline earth hydroxide and aluminum chloride and adding the resultant reagent to the water to be treated, whereby a precipitate is formed in the water, and filtering the water to remove said precipitate.

7. A reagent for treating water which comprises the reaction product resulting from the admixture of aluminum chloride, an alkaline earth hydroxide and an alkaline carbonate.

8. A reagent for treating water which comprises the reaction product resulting from the admixture of aluminum chloride, an alkaline earth hydroxide and sodium carbonate.

9. A reagent for treating water which comprises the reaction product resulting from the admixture of aluminum chloride, lime and soda ash.

10. The process of purifying water which comprises treating the same with an alkaline earth hydroxide, an alkaline carbonate, and aluminum chloride.

WILSON EVANS.